(12) United States Patent
Ferguson et al.

(10) Patent No.: US 8,368,250 B1
(45) Date of Patent: Feb. 5, 2013

(54) SYSTEMS AND METHODS FOR SWAPPING SPAN POWER MODULES IN TELECOMMUNICATION NETWORKS

(75) Inventors: Jason R. Ferguson, Phoenix, AZ (US); Robert S. Kroninger, Peoria, AZ (US); Steven M. Robinson, Madison, AL (US); James B. Wiese, Toney, AL (US); Joseph H. Christ, Elkmont, AL (US)

(73) Assignee: ADTRAN, Inc., Huntsville, AL (US)

( * ) Notice: Subject to any disclaimer, the term of this patent is extended or adjusted under 35 U.S.C. 154(b) by 705 days.

(21) Appl. No.: 12/169,245

(22) Filed: Jul. 8, 2008

(51) Int. Cl.
*H02J 1/00* (2006.01)

(52) U.S. Cl. .............. 307/80; 307/81; 307/64; 307/87
(58) Field of Classification Search .............. 307/23, 307/29, 64–66, 85–87, 80, 81
See application file for complete search history.

(56) References Cited

U.S. PATENT DOCUMENTS

| | | | | |
|---|---|---|---|---|
| 3,917,916 A | * | 11/1975 | Ghosh et al. | 370/243 |
| 3,932,764 A | * | 1/1976 | Corey | 307/85 |
| 4,196,320 A | * | 4/1980 | Townsend | 379/400 |
| 4,571,499 A | * | 2/1986 | Wein | 307/75 |
| 5,309,031 A | * | 5/1994 | Stewart et al. | 307/66 |
| 5,555,151 A | * | 9/1996 | Baker et al. | 361/79 |
| 5,841,842 A | | 11/1998 | Baum et al. | |
| 6,330,176 B1 | * | 12/2001 | Thrap et al. | 363/142 |
| 6,639,329 B2 | * | 10/2003 | Chan et al. | 307/29 |
| 6,950,896 B2 | | 9/2005 | Scordalakes et al. | |
| 7,812,480 B2 | * | 10/2010 | Datta et al. | 307/66 |
| 2003/0043561 A1 | | 3/2003 | Brooks | |
| 2005/0254269 A1 | * | 11/2005 | Lomax et al. | 363/21.12 |

* cited by examiner

*Primary Examiner* — Fritz M Fleming
(74) *Attorney, Agent, or Firm* — Maynard Cooper & Gale, P.C.; Jon E. Holland

(57) ABSTRACT

The present disclosure generally pertains to systems and methods for swapping span power modules that are used for supplying power to network interface units (NIUs). A span power module in accordance with one exemplary embodiment of the present disclosure has logic capable of communicating with logic of another span power module. When one module is to be swapped for the other module, the module being swapped-in is configured to automatically disable the other module shortly after it has powered up and is supplying electrical power across a span line. The amount of time that both modules supply power to the span line is sufficiently small such that damage to electrical communication equipment receiving power from the span line is prevented.

29 Claims, 7 Drawing Sheets

SYSTEMS AND METHODS FOR SWAPPING SPAN POWER MODULES IN TELECOMMUNICATION NETWORKS

RELATED ART

A network interface unit (NIU) is a communication device within a telecommunication network that serves as the point of demarcation between the local exchange carrier network and a customer premise. The network side of the NIU is typically connected to network communication equipment via a span line. The span line often comprises four wires of two twisted-pairs, one twisted-pair for transmission to the NIU and one twisted-pair for transmission from the NIU. Typically, one wire of each respective twisted-pair is referred to as "tip," and the other wire is referred to as "ring." Various types of signals, such as DS1 signals may be communicated across a span line.

A span line is typically coupled to a span power module, which usually controls a DC current across the span line. The span power module delivers electrical power to the span line, and such power is used to power the NIU. Since the NIU is powered by the network, communication with the network remains possible even if there is a disruption in power delivered to the customer premise from other power sources.

Span power modules often reside at a network facility, such as a central office or a terminal office. Traditionally, there was a one-to-one relationship between the span lines and span power modules. In this regard, each span line was connected to its own respective span power module. If the span power module became defective (e.g., if the power supply module stopped delivering power to the span line), then the defective span power module could be replaced with a non-defective one without disturbing other span lines. However, more recently, span power modules are designed to service and power multiple span lines. Sometimes a failure or defect in the span power module causes a problem, such as loss of power, for less than all of the span lines coupled to the module. In such a case, the span power module can be replaced in an attempt to correct the problem for the affected span line or lines. Unfortunately, while the defective module is being swapped for a new one, power to all of the span lines coupled to the defective module is disrupted. Thus, the span lines that are unaffected by the defect in the old span power module are temporarily prevented from communicating during the swap until the new module is installed and powered up.

Although the duration of a disruption to the operational span lines during a swap of a defective span power module can be relatively short (e.g., on the order of a few seconds), it would nevertheless be desirable to prevent the disruption if there was a practical alternative to do so. Ideally, the technician performing the swap would prevent the disruption by installing the new module before the old module is removed such that electrical power is continuously delivered to each operating span line during the swap. If the span power module had a voltage source, then such a technique would be a viable alternative. However, many span power modules in conventional telecommunication networks have current sources. In the case of a current source, powering a span line with multiple span power modules, even for a short duration on the order of just a few seconds, could significantly damage components of the NIU and/or components at the customer premises. Therefore, rather than risking damage to the NIU and customer premise components, technicians usually perform a span power module swap without installing the new module prior to powering down or removing the old module such that communication for the still operating span lines is disrupted for at least a short time period.

BRIEF DESCRIPTION OF THE DRAWINGS

The disclosure can be better understood with reference to the following drawings. The elements of the drawings are not necessarily to scale relative to each other, emphasis instead being placed upon clearly illustrating the principles of the disclosure. Furthermore, like reference numerals designate corresponding parts throughout the several views.

DETAILED DESCRIPTION

The present disclosure generally pertains to systems and methods for swapping span power modules. A span power module in accordance with one exemplary embodiment of the present disclosure has logic capable of communicating with logic of another span power module. When one module is to be swapped for the other module, the module being swapped-in is configured to automatically disable the other module shortly after it has powered up and is supplying electrical power across a span line. The amount of time that both modules supply power to the span line is sufficiently small such that damage to electrical communication equipment receiving power from the span line is prevented.

The techniques described herein for swapping span power modules may be used to replace a defective span power module with a non-defective one. However, it is unnecessary for the module being removed or swapped-out to be defective. For example, in performing preventive maintenance, it may be desirable for a new span power module to be swapped for an old span power module even though the old module has yet to encounter an error or operational problem.

Figure 1:
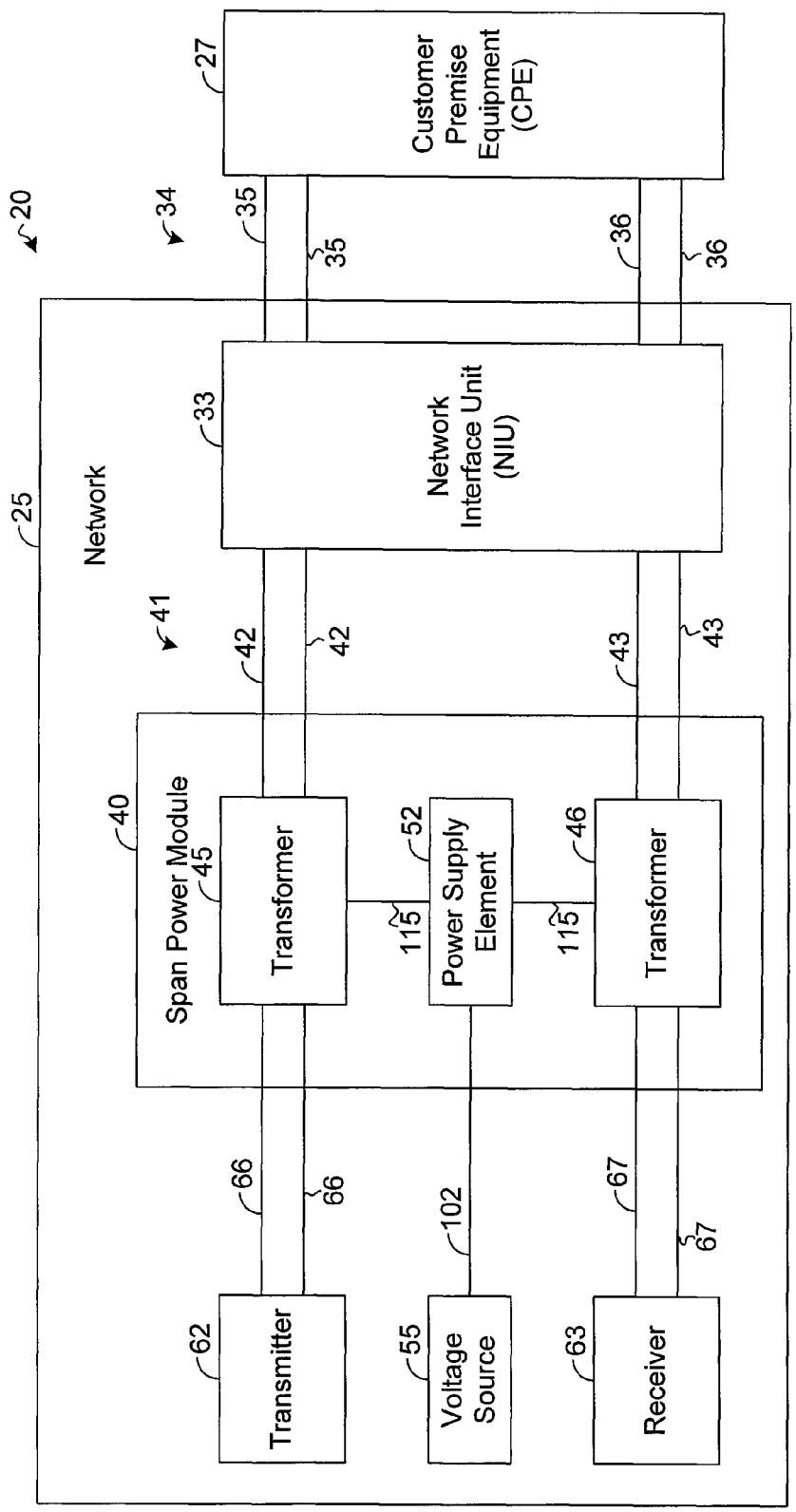
FIG. 1 is a block diagram illustrating an exemplary embodiment of a communication system in accordance with the present disclosure.

FIG. 1 depicts an exemplary embodiment of a communication system 20 in accordance with the present disclosure. The system 20 comprises a telecommunication network 25 for communicating with customer premise equipment (CPE) 27 residing at a customer premises. In this regard, the CPE 27 is coupled to a network interface unit (NIU) 33 via a data communication line 34. In one embodiment, the line 34 comprises two pairs 35, 36 of wires. Each wire pair 35, 36 may be twisted together and referred to as a "twisted pair." In other embodiments, other numbers and types of wires may be employed to connect the NIU 33 to the CPE 27.

The NIU 33 is coupled to a span power module 40 via a span line 41. In the exemplary embodiment shown by FIG. 1, the span line 41 comprises two wire pairs 42, 43. Each wire pair 42, 43 may be twisted together and referred to as a "twisted pair," although other numbers and types of wires may be used in other embodiments. In one exemplary embodiment, DS1 signals are communicated across the span line 41. The NIU 33 receives data from the wire pair 42 and transmits data across the wire pair 43. In other embodiments, other types of signals may be communicated via the span line 41.

As shown by FIG. 1, each wire pair 42, 43 is coupled to a respective transformer 45, 46. A power supply element 52 provides constant electrical current from a network voltage source 55. In this regard, the power supply element 52 is coupled to the voltage source 55 and at least one respective tap (not specifically shown) of each of the transformers 45, 46 that are coupled to the NIU 33, such that one wire pair 42, 43 supplies current and the other wire pair 42, 43 returns current, thereby providing the NIU 33 with electrical power. The NIU 33 uses such electrical current to power electrical components of the NIU 33, and the NIU 33 may forward a portion of the electrical power to the CPE 27 via data line 34.

Note that it is possible to provide electrical power to an NIU 33 via a single wire pair of a span line. In this regard, one wire of the pair may be supply current to the NIU 33, and the other wire of the pair may return current. Thus, it is unnecessary for a span line 42 to comprise multiple wire pairs, as is described for several of the embodiments described herein.

As shown by FIG. 1, the transformers 45, 46 are respectively coupled to a network transmitter 62 and receiver 63 via wire pairs 66, 67. Thus, the transmitter 62 transmits data through wire pair 66, transformer 45, and wire pair 42 to the NIU 33, and the NIU 33 transmits data through wire pair 43, transformer 46, and wire pair 67 to the receiver 63.

In one exemplary embodiment, the network transmitter 62 and receiver 63 reside on a card that is inserted into a slot of a chassis (not shown). In addition, the span power module 40 is also inserted into the chassis. A backplane (not shown) of the chassis connects the network transmitter 62 and receiver 63, as well as the voltage source 55, to the span power module 40. However, other configurations and locations of the components are possible in other embodiments.

In addition, for simplicity of illustration, the span power module 40 shown by FIG. 1 has two transformers 45, 46 for servicing the same NIU 33. Other numbers of transformers 45, 46 are possible in other embodiments, and it is possible for the module 40 to service other numbers of NIUs 33. For example, in one embodiment, a span power module 40 has fifty-six transformers for servicing up to twenty-eight NIUs. In such an embodiment, the power supply element 52 provides electrical power to each NIU as described above for the NIU 33 shown by FIG. 1.

Figure 2:
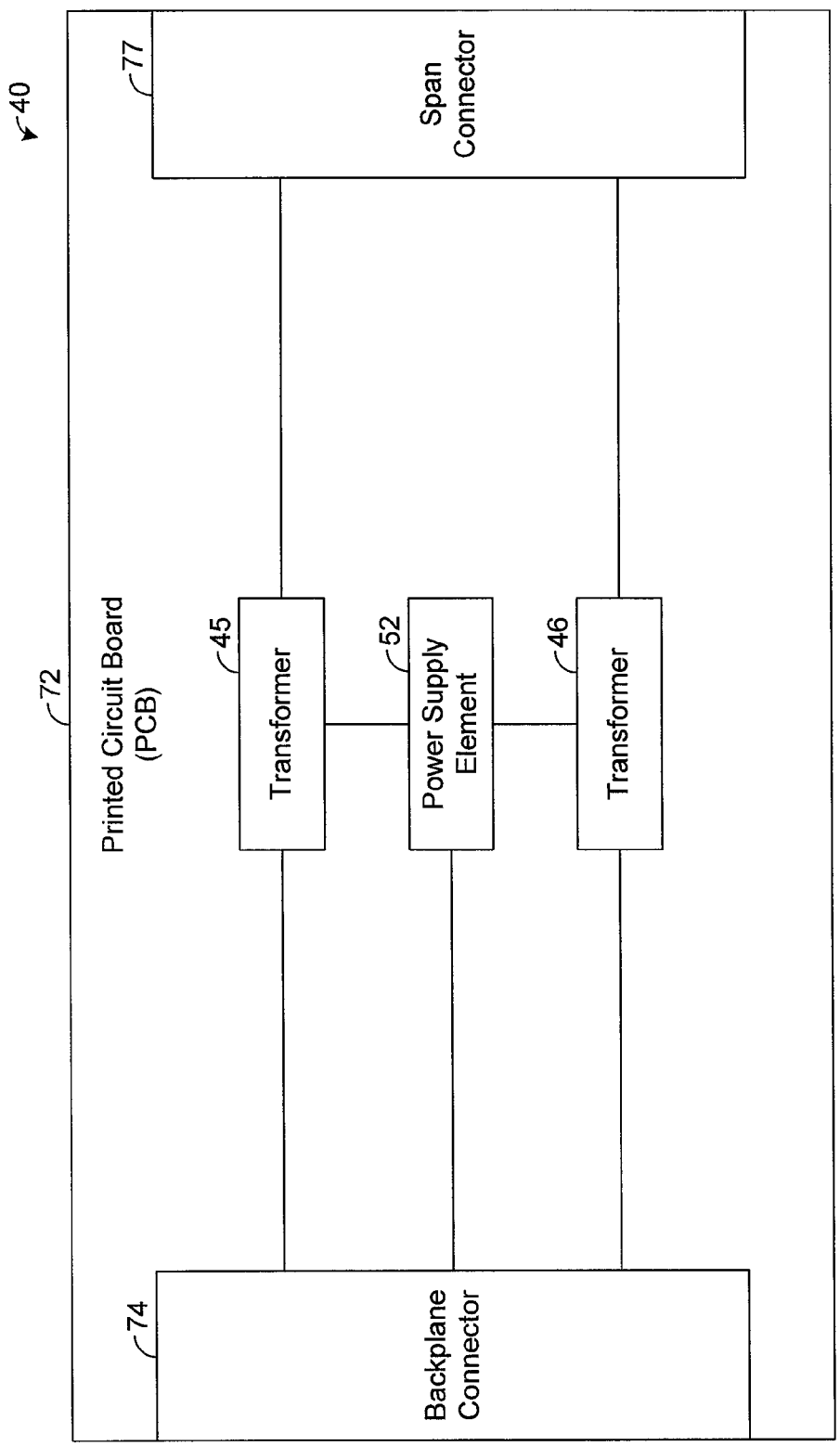
FIG. 2 is a block diagram illustrating an exemplary embodiment of a span power module, such as is depicted in FIG. 1.

FIG. 2 depicts an exemplary embodiment of a span power module 40. As shown by FIG. 2, the components of the span power module 40 reside on a printed circuit board (PCB) 72, which can be inserted into a known or future-developed chassis (not shown). Each transformer 45, 46 is conductively coupled to a backplane connector 74 that is configured to plug into a backplane of the chassis. The backplane is used to communicate data to and from the network receiver 63 and transmitter 62, which may be inserted into the same chassis or a different chassis, if desired. Further, the chassis backplane is also used to deliver electrical power at a constant voltage from the voltage source 55 to the power supply element 52.

The module 40 also comprises a span connector 77. In one exemplary embodiment, the connector 77 comprises a 64-pin ampehenol connector. However, other types of connectors and other numbers of pins may be employed in other embodiments. The span connector 77 is coupled to the span line 41.

In one exemplary embodiment, the span connector 77 is coupled to the span line 41 through the chassis backplane.

For various reasons, it may be desirable to swap the module 40 for another span power module to service the same NIU 33. For example, a defect in the module 40 may prevent power from being supplied to another span line (not shown) coupled to the module 40. In another example, it may be desirable to replace the module 40 with a new span power module even if no defect in the module 40 is detected, as part of a preventive maintenance strategy in an effort to prevent errors or problems before they occur. There may be various other reasons for swapping span power modules.

Figure 3:
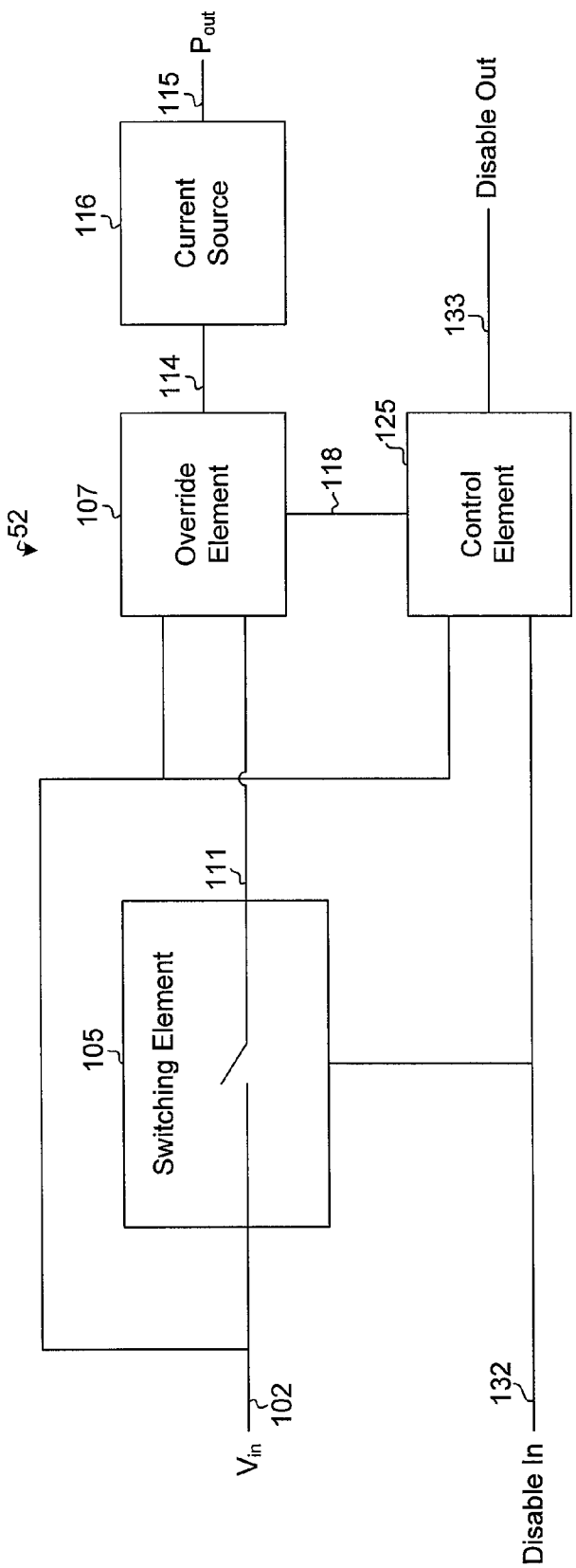
FIG. 3 is a block diagram illustrating an exemplary embodiment of a power supply element, such as is depicted in FIG. 2.

Exemplary techniques for performing a module swap will be described in more detail hereafter. Ideally, the swap is performed such that service provided to any NIU 33 that is still communicating via the module 40 is not interrupted. FIG. 3 depicts an exemplary embodiment of the power supply element 52, which enables hot swapping of one span power module 40 for another. As used herein, "hot swapping" or a "hot swap" refers to a swap of one span power module for another such that electrical power is continuously provided, by the swapped power modules, to at least one span line and, therefore, at least one NIU during the swap.

As shown by FIG. 3, the power supply element 52 comprises a conductive connection 102, referred to herein as the "$V_{in}$ connection," which is electrically coupled to the voltage source 55 (FIG. 1). In the instant embodiment, the connection 102 is a two-wire connection, one wire at a first voltage for supplying current and the other wire at a different voltage for returning current. In this regard, the connection 102 carries power generated by the voltage source 55. The connection 102 may have other numbers of wires in other embodiments.

The connection 102 is coupled to a switching element 105 and an override element 107. Further, the switching element 105 is coupled to the override element 107 via a conductive connection 111. In addition, a conductive connection 114 is coupled to the override element 107, and a conductive connection 118, referred to herein as the "override connection," couples the override element 107 to a control element 125. Further, the $V_{in}$ connection 102, a conductive connection 132, referred to herein as the "Disable$_{in}$ Connection," and a conductive connection 133, referred to as the "Disable$_{out}$ Connection," are coupled to the control element 125.

A current source 116 is coupled to the override element 107 via the connection 114. The current source 116, using the power received from the network voltage source 55, provides a constant current across a conductive connection 115, referred to herein as the "$P_{out}$ Connection." At times, each of the connections 111, 114, 115 carry electrical power and, therefore, comprise at least two wires, one wire for supplying current and one wire for returning current.

The $P_{out}$ connection 115 is coupled to each transformer 45, 46. In this regard, one wire of the $P_{out}$ Connection 115 is coupled to the transformer 45, and another wire is coupled to the transformer 46. At times, power from the current source 116 is supplied via the $P_{out}$ connection 115 to the transformers 45, 46 such that one of the wire pairs 42, 43 supplies current to the NIU 33 and the other wire pair 42, 43 returns current from the NIU 33.

The switching element 105, the override element 107, and the control element 125 may be implemented in hardware, software, or a combination thereof. If any portion of the power supply element 52 is implemented in software, the element 52 may comprise an instruction execution device (not shown), such as a digital signal processor, to execute instructions of the software. Such software may be stored on any computer-readable medium for use by and in connection with such an instruction execution device.

In one exemplary embodiment, the switching element 105 is implemented as a hardware switch that switches between an open state and a closed state based on a control signal transmitted via the Disable$_{in}$ connection 132. In this regard, if the signal, referred to as a "Disable signal," transmitted across the connection 132 is asserted, then the switching element 105 electrically separates the connection 111 from the V$_{in}$ connection 102. In other words, the element 105 is in an open state. However, if the Disable signal is deasserted, then the element 105 is in a closed state such that the connection 111 is electrically coupled to the V$_{in}$ connection 102. Accordingly, when the Disable signal received by element 105 is deasserted, the power carried by the V$_{in}$ connection 102 is supplied across the connection 111 to an input of the override element 107.

Note that terms "asserted" and "deasserted" do not connote a specific logical value. In this regard, any logical value may be used to indicate an asserted state as long as a different logical value is used to indicate an asserted state. For example, for any signal, the signal may be asserted when it has a logical "1" or "high" value and deasserted when it has a logical "0" or "low" value. Alternatively, the signal may be asserted when it has a logical "0" or "low" value and asserted when it has a logical "1" or "high" value. Further, it is possible for any logical value indicating an asserted state or a deasserted state to have multiple bits.

In one exemplary embodiment, the override element 107 is implemented as a multiplexor based on a control signal transmitted via the override connection 118 from the control element 125, although the override element 107 may have other configurations in other embodiments. In this regard, if the control signal is asserted, then the override element 107 electrically couples the V$_{in}$ connection 102 to the connection 114 and electrically separates the connection 111 from the connection 114. However, if the control signal is deasserted, then the override element 107 electrically couples the connection 111 to the connection 114 and electrically separates the V$_{in}$ connection 102 from the connection 114. Thus, the power carried by the V$_{in}$ connection 102 is supplied to the current source 116 via the connection 114 if the control signal carried by connection 118 is asserted regardless of the state of the switching element 105. In other words, the element 107 overrides the switching element 105 if the control signal carried by connection 118 is asserted. However, if the control signal is deasserted, then the element 107 does not override the switching element 105. Thus, if the control signal is deasserted, the power carried by the V$_{in}$ connection 102 is transmitted across the connection 118 only if the switching element 105 is in the closed state. Note that other configurations of the elements 105, 107 are possible in other embodiments.

When the current source 116 receives power from the voltage source 55 through the override element 107, the current source 116 drives the connection 115 with a constant electrical current thereby supplying the NIU 33 with electrical power via the span line 41. In this regard, electrical current is supplied to the NIU 33 via one wire pair 42, 43 and is returned via the other wire pair 42, 43. For example, current may be supplied via wire pair 42 and returned via wire pair 43, or vice versa.

Figure 4:
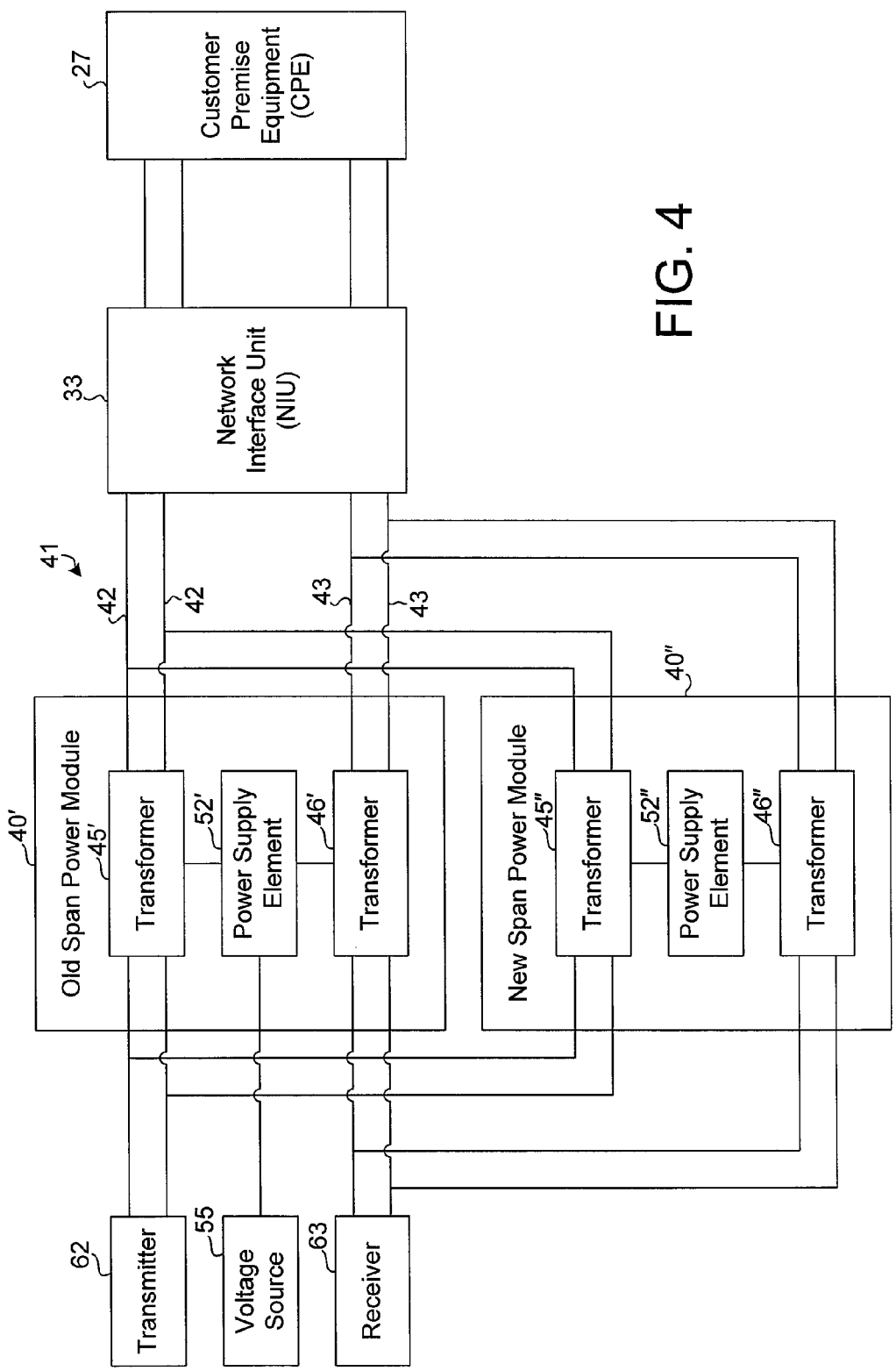
FIG. 4 is a block diagram illustrating two exemplary span power modules in which one of the span power modules is being swapped for the other.

To better illustrate how the power supply element 52 may be used to perform a hot swap of two span power modules, refer to FIG. 4, which depicts a span power module 40' coupled to a NIU 33, as described above. In this regard, the NIU 33 is coupled to a network transmitter 62 and receiver 63 through a pair of transformers 45', 46' as shown by FIG. 4.

Further, a power supply element 52' of the module 40' is coupled to a voltage source 55 and the transformers 45', 46'. In this regard, except as otherwise described herein, the power supply element 52' transmits constant electrical current via the transformers 45', 46' and wire pairs 42, 43 to the NIU 33, which is powered by such electrical current.

Assume that it is desirable to replace the module 40', referred to hereafter as "old module," with a module 40", referred to hereafter as "new module." For example, the module 40' may have other transformers (not shown) coupled to other span lines (not shown), and assume that a failure in the module 40' prevents the module 40' from supplying power to at least one of the other span lines. Thus, it is desirable to replace the module 40' with non-defective module 40".

As shown by FIG. 4, the new module 40" is electrically coupled to the network transmitter 62 and receiver 63 and to the span line 41. In particular, one transformer 45" is coupled to the transmitter 62 and the wire pair 42, and the other transformer 46" is coupled to the receiver 63 and the wire pair 43.

Figure 5:
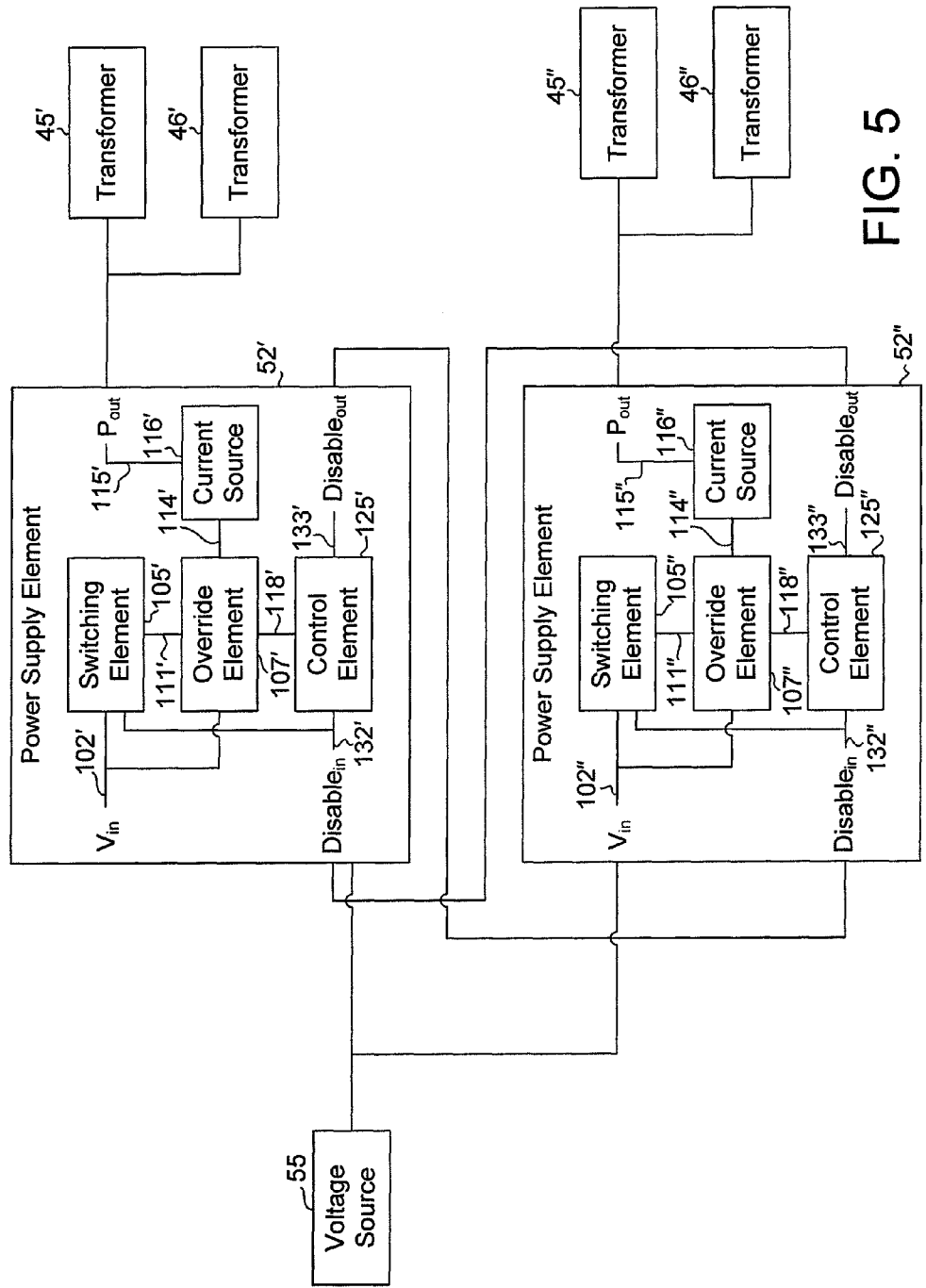
FIG. 5 is a block diagram illustrating the two exemplary span power modules depicted in FIG. 4.

Before the hot swap is performed, the modules 40', 40" are coupled to one another, as shown by FIG. 5. Referring to FIGS. 4 and 5, the V$_{in}$ connections 102', 102" of the power supply elements 52', 52" are both coupled to the voltage source 55. Further, at least one wire of the P$_{out}$ connection 115' of the power supply element 52' is coupled to the transformer 45', and at least one wire of the P$_{out}$ connection 115" of the power supply element 52" is coupled to the transformer 45". In addition, at least one wire of the P$_{out}$ connection 115' of the power supply element 52' is coupled to the transformer 46', and at least one wire of the P$_{out}$ connection 115" of the power supply element 52" is coupled to the transformer 46".

Further, the Disable$_{in}$ connection 132' of the power supply element 52' is coupled to the Disable$_{out}$ connection 133" of the power supply element 52", and the Disable$_{out}$ connection 133' of the power supply element 52' is coupled to the Disable$_{in}$ connection 132" of the power supply element 52". Note that the new module 40" may be inserted into the same chassis (not shown) as the old module 40' and interfaced with the chassis backplane in order to couple the new module 40' to the transmitter 62 and receiver 63 as shown. Further, the chassis backplane may also be used to couple the modules 40', 40" to one another and to couple each of the modules 40', 40" to the span line 41.

Initially, the control element 125' of the old module 40' is transmitting an asserted Disable signal via its Disable$_{out}$ connection 133'. Generally, the purpose of the asserted Disable signal is to disable other span power modules that may be coupled to the same NIU 33 as the old module 40' in an effort to prevent multiple span power modules from simultaneously providing power to the NIU 33. In this regard, the Disable$_{in}$ connection of any span power module coupled to the same NIU 33 as the old module 40' is preferably coupled to the Disable$_{out}$ connection 133' of the old module 40'. In general, except as further described herein, the asserted Disable signal from the old module 40' disables any such other module from simultaneously supplying power to the span line 41.

Moreover, in the instant example in which the new module 40" is being swapped for the old module 40', the new module 40" at time $t_0$ is plugged into the chassis backplane. At this point, the new module 40" is interfaced with the old module 40' and the voltage source 55 through the chassis backplane. Note that other types of interfaces may be used to interface the modules 40', 40" and/or interface either of the modules 40', 40" with a power source.

Figure 6:
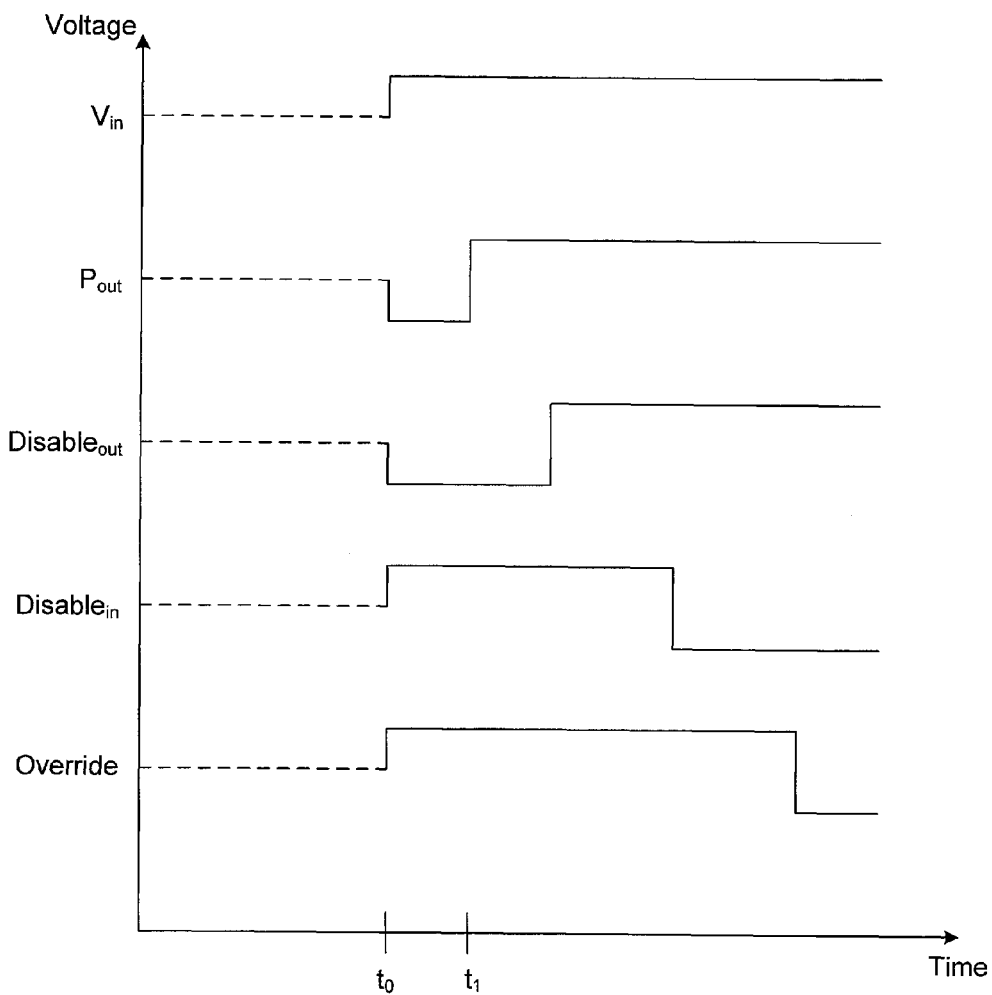
FIG. 6 is a timing diagram illustrating various signals for a span power module that is being swapped with another span power module.

At time $t_0$, the new module 40" begins receiving power from the voltage source 55 and the asserted Disable signal received from the old module 40' via the Disable$_{in}$ connection 132", as shown by FIG. 6. A portion of the power is supplied to the control element 125" of the new module 40". Upon power up, the control element 125" initializes the Override signal transmitted across the connection 118" to the override element 107". Initially, the control element 125" asserts the Override signal, as shown by FIG. 6.

In addition, at time $t_0$, the new module 40" begins transmitting a Disable signal to the old module 40'. In this regard, the Disable signal is transmitted via the Disable$_{out}$ connection 133". Further, as shown by FIG. 6 and as further described above, this Disable signal is initially deasserted.

Immediately following time $t_0$, the switching element 105" of the new module 40" is disabled based on the asserted Disable signal received via the Disable$_{in}$ connection 132". Therefore, the $V_{in}$ connection 102" is electrically separated from connection 111" by the switching element 105" thereby preventing power from flowing through the switching element 105" to the override element 107". However, as the module 40" is powered up based on the power from the voltage source 55, the override element 107" is eventually forced to a state that allows power to pass from the $V_{in}$ connection 102" effectively overriding the switching element 105". In this regard, as described above and is shown by FIG. 6, the Override signal transmitted by the control element 125" across the connection 118" is initially asserted. Based on the asserted Override signal, the override element 107" selects the current on the $V_{in}$ connection 102" for output on the connection 114". Thus, the current source 116" receives power from the network voltage source 55 and uses such power to transmit constant electrical current across the $P_{out}$ connection 115" to the transformers 45", 46". Accordingly, at some time $t_1$ after $t_0$, the new span power module 40" begins supplying electrical power across the span line 41 to the NIU 33, as shown by FIG. 6. Note that, at time $t_1$, the old span power module 40' is still supplying electrical power across the span line 41 as well.

After a sufficient time period has elapsed since power-up to ensure that the new module 40" is supplying electrical power to the NIU 33, the control element 125" of the new module 40" asserts the Disable signal being transmitted across its Disable$_{out}$ connection 133", as shown by FIG. 6. In other words, the control element 125" asserts the Disable signal transmitted across its Disable$_{out}$ connection 133" shortly after $t_1$. The asserted Disable signal transmitted from the new module 40" is received via the Disable$_{in}$ connection 132' of the old module 40'. In response to the asserted Disable signal, the switching element 105' switches from a closed state to an open state. Thus, the $V_{in}$ connection 102' is electrically separated from the connection 111' by the switching element 105'. Since the Override signal transmitted across the connection 118' is deasserted, the override element 107' is disabled from overriding the switching element 105'. Thus, the override element 107' electrically separates the connection 114' from the $V_{in}$ connection 102' and electrically couples the connection 111' to the connection 114'. Since the switching element 105' is in an open state, current is prevented from flowing through the switching element 105' effectively cutting off power to the current source 116'. Accordingly, the old span power module 40' stops supplying power to the span line 41.

In addition, upon receiving the asserted Disable signal from the new module 40", the control element 125' of the old module 40' deasserts the Disable signal being transmitted across its Disable$_{out}$ connection 133'. This Disable signal is received by the new module 40" via its Disable$_{in}$ connection 132". In response to the deasserted Disable signal, the switching element 105" of the new module 40" transitions from an open state to a closed state such that the $V_{in}$ connection 102" is electrically coupled to the connection 111" via the switching element 105".

Also in response to the deasserted Disable signal, the control element 125" of the new module 40" deasserts the Override signal transmitted across connection 118". At this point, the old module 40' is no longer attempting to disable the new module 40" from supplying power to the span line 41 (i.e., the Disable signal received via the Disable$_{in}$ connection 132" is deasserted), and the module swap is essentially complete since the old module 40' is no longer powering the span line 41 and is not attempting to disable the new module 40". Thus, the old module 40' can be disconnected from the span line 41. Moreover, deasserting the Override signal transmitted across connection 118" of the new module 40", as described above and shown by FIG. 6, allows the new module 40" to later be disabled, in the same manner described above, by another module in the event that it becomes desirable to replace the new module 40" with the other module.

Note that for a short time period, both the old module 40" and the new module 40" are simultaneously supplying power to the span line 41 and, therefore, to the NIU 33. In this regard, both modules 40', 40" are simultaneously providing power from the time $t_1$ until the old module 40' receives the asserted Disable signal from the new module 40" and the switching element 105' switches to an open state in response to such signal. However, the modules 40', 40" are preferably configured such that the duration of this time period is small enough to prevent damage to the electrical components of the NIU 33 or other devices receiving power from the NIU 33. In one exemplary embodiment, the duration of such time period is on the order of about 10 milliseconds, but other durations are possible in other embodiments.

An exemplary method for hot swapping the modules 40', 40" will be described below with particular reference to FIG. 7.

Initially, the old module 40' is coupled to the span line 41 and is supplying the line 41 with power. In order to swap the new module 40" for the old module 40', the new module 40" is coupled to the span line 41 and the old module 40', as shown by FIGS. 4 and 5, respectively. The new module 40" is also coupled to the voltage source 55 at which point the new module 40" begins supplying power to the span line 41, as shown by block 222 of FIG. 7. In this regard, upon power-up, the control element 125" of the new module 40" initially transmits an asserted Override signal to the override element 107". Thus, even though the switching element 105" is disabled by the Disable signal being transmitted from the old module 40', power is supplied through the override element 107" thereby powering the current source 116", which supplies a constant electrical current to the NIU 33 via the $P_{out}$ connection 115", the transformers 45", 46", and the wire pairs 42, 43.

After power is being supplied by the new module 40" to the span line 41, the new module 40" disables the old module 40', as shown by block 225 of FIG. 6. In this regard, the control element 125" of the new module 40" asserts the Disable signal being transmitted from the Disable$_{out}$ connection 133" of the new module 40" to the Disable connection 132' of the old module 40'. Note that, in FIG. 7, the term "mate" refers to the other span power module that is coupled to the Disable$_{in}$ and Disable$_{out}$ connections of the module being described. Thus, in the instant example, the term "mate" used in block 225 refers to the old module 40' being swapped-out.

In response to assertion of this Disable signal, the old module 40' stops supplying power to the span line 41. In this regard, the switching element 105' of the old module 40' transitions to an open state thereby preventing power from flowing through the switching element 105'. Also in response to assertion of the Disable signal received by the old module 40', the control element 125' of the old module 40' deasserts the Disable signal being transmitted across the Disable$_{out}$ connection 133' of the old module 40" to the Disable$_{in}$ connection 132" of the new module 40". Thus, assertion of this Disable signal indicates that the module swap is essentially complete, at least from the perspective of the new module 40". At this point the old module 40' can be disconnected from the span line 41.

Figure 7:
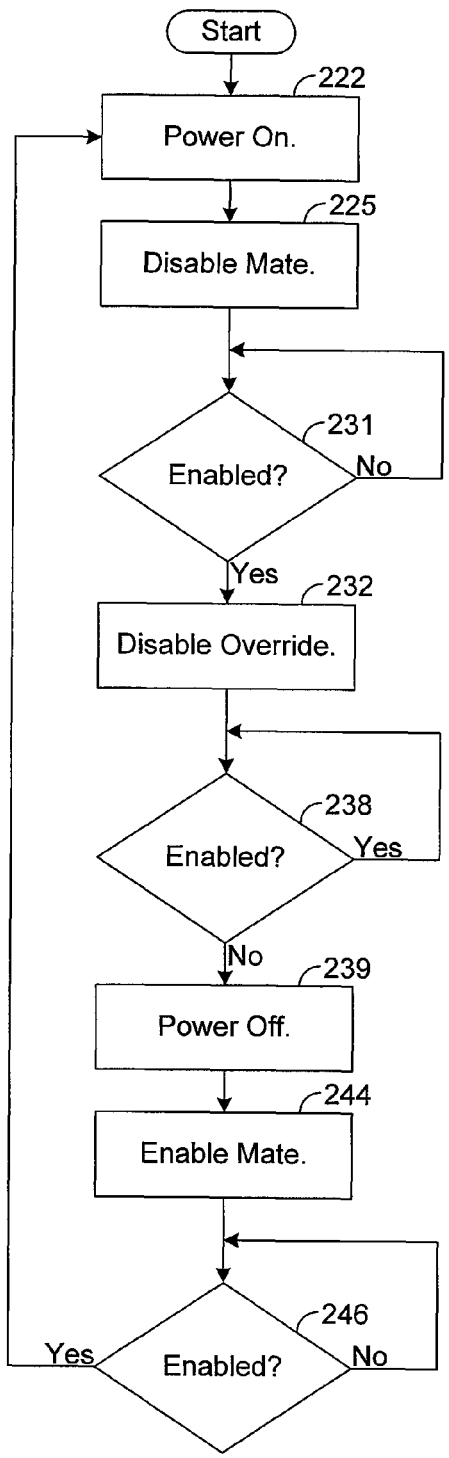
FIG. 7 is a flow chart illustrating an exemplary method for hot swapping one span power module for another.

As shown by blocks 231, 232 of FIG. 7, the control element 125" of the new module 40" waits for the Disable signal from the old module 40' to be deasserted, indicating that the new module 40" is now enabled, before disabling the override element 107" from overriding the switching element 105". In this regard, in response to a transition of the Disable signal from the old module 40' to a deasserted state, the control element 125" of the new module 40" deasserts the Override signal being transmitted to the override element 107" thereby disabling this element 107" from overriding the switching element 105". When the element 107" does not override the switching element 105", the switching element 105" controls whether the power on the V$_{in}$ connection 102" passes to the current source 116" and, therefore, whether the current source 116" supplies power to the span line 41. Thus, disabling the override element 107" from overriding the switching element 105" allows the module 40" to be later disabled by transmitting an asserted Disable signal to the Disable$_{in}$ connection 132", such as when another span power module is being swapped for the module 40".

In this regard, assume that at some point after installation of the module 40", it becomes desirable to swap yet another span power module for the module 40". As described above, this other module can be coupled to the span line 41 and to the module 40" in the same way that module 40" is shown as being connected to the span line 41 and module 40' in FIGS. 4 and 5. As described above, once the other module is powered-up, it transmits an asserted Disable signal to the Disable$_{in}$ connection 132" of the module 40" thereby disabling the module 40". Thus, as shown by blocks 238, 239, the module 40" switches off the power being delivered to the span line 41. In this regard, the switching element 105" of the module 40", in response to the asserted Disable signal received via connection 132", switches from a closed state to an open state thereby preventing power from reaching the current source 116".

In addition, in response to the asserted Disable signal received via connection 132", the control element 125" of the module 40" deasserts the Disable signal being transmitted via the Disable$_{out}$ connection 133" thereby enabling the other module, as shown by block 244 of FIG. 7. Note that the term "mate" used in block 244 no longer refers to the old module 40' described above but rather to the span power module (not shown) that is now coupled to the connections 132", 133" of module 40". At this point, the module 40" is no longer supplying power to the span line 41. As shown by block 246, the process described above for module 40" is repeated if the module 40" later receives a deasserted Disable signal via connection 132" indicating that the module 40" is enabled, such as when the module 40" is being swapped for yet another module.

The invention claimed is:

1. A system for swapping span power modules, comprising:
   a span line;
   a network interface unit (NIU) coupled to the span line;
   a first span power module having a first current source coupled to the span line; and
   a second span power module having a second current source coupled to the span line, wherein the second span power module is configured to supply power from the second current source to the span line while the first span power module is simultaneously supplying power from the first current source to the span line, and wherein the second span power module is configured to automatically disable the first span module from supplying the span line with power from the first current source after the second span power module has begun supplying the span line with power from the second current source such that the first and second power modules simultaneously supply power to the span line from the first and second current sources for a time period sufficiently small to prevent power from the first and second current sources from damaging the NIU.

2. The system of claim 1, wherein the second span power module is configured to transmit a disable signal to the first span power module, and wherein the first span module is configured to stop supplying the span line with power from the first current source in response to the disable signal and to cause the second span power module to transition to a state that allows the second span power module to be disabled, by another span power module, from supplying the span line with power.

3. The system of claim 1, wherein the second span power module comprises at least one transformer coupled to the second current source and the span line.

4. The system of claim 3, wherein the second span power module comprises a printed circuit board (PCB), and wherein the transformer and the second current source reside on the PCB.

5. The system of claim 3, wherein the second span power module comprises:
   a switching element coupled to a network voltage source and configured to selectively transmit power from the network voltage source based on a first disable signal received from the first span power module.

6. The system of claim 5, wherein the second span power module is configured to transmit a second disable signal to the first span power module, and wherein the first span power module, in response to the second disable signal, is configured to stop supplying the span line with power from the first current source and to deassert the first disable signal.

7. The system of claim 6, wherein the switching element is configured to transmit the power from the network voltage source in response to a transition of the first disable signal to a deasserted state.

8. The system of claim 7, wherein the second span power module comprises an override element configured to ensure that the second span power module supplies the span line with power from the second current source regardless of a state of the switching element prior to the first disable signal transitioning to a deasserted state.

9. The system of claim 8, wherein the switching element is configured to control whether the second span power module supplies power to the span line after the first disable signal transitions to a deasserted state.

10. The system of claim 1, wherein the second span power module comprises a switching element configured to selectively supply the second current source with power from a network voltage source based on a first disable signal received from the first span power module.

11. The system of claim 10, wherein the second span power module comprises an override element configured to selectively override the switching element.

12. The system of claim 10, wherein the second span power module comprises an override element configured to override the switching element based on the first disable signal.

13. The system of claim 10, wherein the second span power module is configured to ensure that the second current source supplies the span line with power regardless of a state of the switching element prior to the first disable signal transitioning to a deasserted state.

14. The system of claim 10, wherein the second span power module is configured to transmit a second disable signal, wherein the first span power module is configured to control whether the first current source supplies power to the span line based on the second disable signal, and wherein the first span power module is configured to transition the first disable signal based on the second disable signal.

15. The system of claim 1, wherein the second span power module has a switching element coupled between the span line and the second current source, wherein the first span power module is configured to transmit a disable signal for disabling the second power module from supplying power to the span line from the second current source, wherein the switching element is configured to transition to an open state for preventing power from flowing through the switching element to the span line in response to assertion of the disable signal, wherein the switching element is further configured to transition to a closed state for permitting power to flow through the switching element to the span line in response to deassertion of the disable signal, wherein the second span power module is configured to receive the disable signal during the time period and to ensure that power from the second current source is supplied to the span line for an entire duration of the time period regardless of the disable signal, and wherein the disable signal is asserted during the time period.

16. The system of claim 1, wherein the second span power module has a switching element coupled between the span line and the second current source, wherein the first span power module is configured to transmit a disable signal for disabling the second power module from supplying power to the span line from the second current source, wherein the switching element is configured to transition to an open state for preventing power from flowing through the switching element to the span line in response to assertion of the disable signal, wherein the switching element is further configured to transition to a closed state for permitting power to flow through the switching element to the span line in response to deassertion of the disable signal, wherein the second span power module is configured to receive the disable signal during the time period and has an overriding element for overriding a state of the disable signal during the time period such that power from the second current source is supplied to the span line for an entire duration of the time period regardless of the disable signal, wherein the disable signal is asserted during the time period, and wherein the second span power module has a control element configured to disable the override element from overriding the disable signal in response to deassertion of the disable signal.

17. The system of claim 16, wherein the override element is coupled to the second current source, the span line, and the switching element, and wherein the override element is configured to permit power from the second current source to bypass the switching element when enabled by the control element for overriding the disable signal.

18. A span power module, comprising:
a first connector for interfacing with a span line;
a second connector for interfacing with a second span power module;
at least one transformer coupled to the first and second connectors; and
a power supply element having a current source and configured to supply the span line with power from the current source while the second span power module is simultaneously supplying the span line with power, the power supply element configured to automatically disable the second span power module from supplying power to the span line after the power supply element has begun supplying the span line with power from the current source such that the power supply element and the second power module simultaneously supply power to the span line for a time period sufficiently small to prevent power from the power supply element and the second current source from damaging the NIU.

19. The span power module of claim 18, wherein the second connector is coupled to a network voltage source.

20. The span power module of claim 18, further comprising a printed circuit board (PCB), wherein the first connector, the second connector, and the power supply element reside on the PCB.

21. The span power module of claim 18, further comprising a switching element configured to selectively supply the current source with power from a network voltage source based on a disable signal received from the second span power module.

22. The span power module of claim 21, further comprising an override element configured to selectively override the switching element.

23. The span power module of claim 18, wherein the power supply element has a switching element coupled between the span line and the current source, wherein the second span power module is configured to transmit a disable signal for disabling the power supply element from supplying power to the span line from the current source, wherein the switching element is configured to transition to an open state for preventing power from flowing through the switching element to the span line in response to assertion of the disable signal, wherein the switching element is further configured to transition to a closed state for permitting power to flow through the switching element to the span line in response to deassertion of the disable signal, wherein the power supply element is configured to receive the disable signal during the time period and to ensure that power from the current source is supplied to the span line for an entire duration of the time period regardless of the disable signal, and wherein the disable signal is asserted during the time period.

24. The span power module of claim 18, wherein the power supply element has a switching element coupled between the span line and the current source, wherein the second span power module is configured to transmit a disable signal for disabling the power supply element from supplying power to the span line from the current source, wherein the switching element is configured to transition to an open state for preventing power from flowing through the switching element to the span line in response to assertion of the disable signal, wherein the switching element is further configured to transition to a closed state for permitting power to flow through the switching element to the span line in response to deassertion of the disable signal, wherein the power supply element is configured to receive the disable signal during the time period and has an overriding element for overriding a state of the disable signal during the time period such that power from the current source is supplied to the span line for an entire duration of the time period regardless of the disable signal, wherein the disable signal is asserted during the time period, and wherein the power supply element has a control element configured to disable the override element from overriding the disable signal in response to deassertion of the disable signal.

25. The system of claim 24, wherein the override element is coupled to the current source, the span line, and the switching element, and wherein the override element is configured to permit power from the current source to bypass the switching element when enabled by the control element for overriding the disable signal.

26. A method for swapping span power modules, comprising the steps of:
supplying power from a current source of a first span power module to a network interface unit (NIU) via a span line;
supplying power from a current source of a second span power module to the NIU via the span line for a time period while the current source of the first span power module is simultaneously supplying power to the NIU via the span line; and
automatically disabling the first span power module from supplying power to the NIU after initiation of the step of supplying the power from the current source of the second span power module such that the time period is sufficiently small to prevent power from the current sources of the first and second span power modules from damaging the NIU during the supplying step, wherein the disabling step comprises the step of transmitting a disable signal from the second span power module to the first span power module.

27. The method of claim 26, further comprising the steps of:
transmitting a signal from the first span power module to the second span power module in response to the disable signal; and
allowing the second power module to be disabled based on the signal transmitted from the first span power module.

28. The method of claim 26, wherein the second span power module has a switching element coupled between the span line and the current source of the second span power module, and wherein the method further comprises:

transmitting, from the first span power module, a disable signal for disabling the second power module from supplying power to the span line from the current source of the second span power module;
transitioning the switch element to an open state for preventing power from flowing through the switching element to the span line in response to assertion of the disable signal;
transitioning the switching element to a closed state for permitting power to flow through the switching element to the span line in response to deassertion of the disable signal;
receiving, via the second span power module, the disable signal during the time period; and
ensuring that power from the current source of the second span power module is supplied to the span line for an entire duration of the time period regardless of the disable signal, wherein the disable signal is asserted during the time period.

29. The method of claim 26, wherein the second span power module has a switching element coupled between the span line and the current source of the second span power module, wherein the method further comprises:
transmitting, from the first span power module, a disable signal for disabling the second power module from supplying power to the span line from the current source of the second span power module;
transitioning the switching element to an open state for preventing power from flowing through the switching element to the span line in response to assertion of the disable signal;
transitioning the switching element to a closed state for permitting power to flow through the switching element to the span line in response to deassertion of the disable signal;
receiving, via the second span power module, the disable signal during the time period;
overriding a state of the disable signal during the time period such that power from the current source of the second span power module is supplied to the span line for an entire duration of the time period regardless of the disable signal, wherein the disable signal is asserted during the time period; and
disabling the overriding step in response to deassertion of the disable signal.

* * * * *